(12) United States Patent
Eguchi

(10) Patent No.: US 11,755,864 B2
(45) Date of Patent: Sep. 12, 2023

(54) IMAGE FORMING APPARATUS, METHOD FOR CONTROLLING IMAGE FORMING APPARATUS, INFORMATION PROCESSING METHOD, AND STORAGE MEDIUM

(71) Applicant: CANON KABUSHIKI KAISHA, Tokyo (JP)

(72) Inventor: Kimimori Eguchi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/891,469

(22) Filed: Aug. 19, 2022

(65) Prior Publication Data
US 2023/0068738 A1 Mar. 2, 2023

(30) Foreign Application Priority Data
Aug. 30, 2021 (JP) .................. 2021-139996

(51) Int. Cl.
*G06K 15/00* (2006.01)
*G06K 15/02* (2006.01)

(52) U.S. Cl.
CPC ....... *G06K 15/188* (2013.01); *G06K 15/1803* (2013.01); *G06K 15/1836* (2013.01); *G06K 15/1886* (2013.01)

(58) Field of Classification Search
None
See application file for complete search history.

(56) References Cited

U.S. PATENT DOCUMENTS

| | | | | |
|---|---|---|---|---|
| 2013/0135632 A1* | 5/2013 | Yamada | ............ | G06K 15/1822 358/1.9 |
| 2015/0254031 A1* | 9/2015 | Yabe | .................... | G06K 15/186 358/2.1 |
| 2016/0173727 A1* | 6/2016 | Kimura | .................... | H04N 1/58 358/2.1 |
| 2018/0270391 A1* | 9/2018 | Sugahara | ............ | H04N 1/40012 |
| 2022/0201153 A1* | 6/2022 | Kobayashi | ......... | G06K 15/1852 |

FOREIGN PATENT DOCUMENTS

JP 2006238106 A 9/2006

\* cited by examiner

*Primary Examiner* — Dung D Tran
(74) *Attorney, Agent, or Firm* — ROSSI, KIMMS & McDOWELL LLP

(57) ABSTRACT

Provided is an image forming apparatus including: an obtainment unit configured to obtain print data including drawing commands; a first image processing unit configured to perform conversion of color information for drawing an object having a non-image attribute among objects to be drawn by the drawing commands; a command execution unit configured to generate raster image data based on the drawing commands; a storage configured to store the generated raster image data to perform predetermined output; a second image processing unit configured to perform conversion of color information on an object having a picture attribute in the generated raster image data; and a control unit configured to perform the predetermined output in a case where a predetermined condition is met.

18 Claims, 10 Drawing Sheets

| | INPUT IMAGE | R | G | B | Gray |
|---|---|---|---|---|---|
| 406 | | 255 | 128 | 128 | 166 |
| 407 | | 153 | 153 | 255 | 165 |

FIG.6A

| | INPUT IMAGE | R | G | B | Gray |
|---|---|---|---|---|---|
| 406 | | 255 | 128 | 128 | 190 |
| 407 | | 153 | 153 | 255 | 120 |

FIG.6B

IMAGE FORMING APPARATUS, METHOD FOR CONTROLLING IMAGE FORMING APPARATUS, INFORMATION PROCESSING METHOD, AND STORAGE MEDIUM

BACKGROUND

Field

A technique of the present disclosure relates to a method for controlling data stored in an image forming apparatus.

Description of the Related Art

Some image forming apparatuses are capable of displaying a preview based on image data to be printed before printing.

Japanese Patent Laid-Open No. 2006-238106 describes an image forming apparatus that has a storage configured to store image data to be printed and that displays a preview based on the stored image data. Japanese Patent Laid-Open No. 2006-238106 also states that, in a case of not displaying a preview, the image forming apparatus performs printing processing after performing predetermined image processing on the stored image data.

In color-to-monochrome conversion, it may be required that an object such as a graphic be color-converted in such a manner as to improve discriminability and that an object such as a picture be color-converted in such a manner as to maintain gradation. In this case, it is conceivable to execute color conversion twice: color conversion processing on an object such as a graphic first, and color conversion processing on an object such as a picture next.

However, in the case of performing color conversion twice, depending on the timing of displaying a preview, an image in which only some objects are color-converted while the other objects are not color-converted may be displayed as a preview. This may give a feeling of strangeness to a user who sees the preview.

SUMMARY OF THE DISCLOSURE

An image forming apparatus of the present disclosure includes: an obtainment unit configured to obtain print data including drawing commands; a first image processing unit configured to perform conversion of color information for drawing an object having a non-image attribute among objects to be drawn by the drawing commands; a command execution unit configured to generate raster image data based on the drawing commands; a storage configured to store the generated raster image data to perform predetermined output; a second image processing unit configured to perform conversion of color information on an object having a picture attribute in the generated raster image data; and a control unit configured to perform the predetermined output in a case where a predetermined condition is met.

Further features of the present disclosure will become apparent from the following description of exemplary embodiments with reference to the attached drawings.

BRIEF DESCRIPTION OF THE DRAWINGS

FIGS. 6A and 6B are diagrams showing an example color value list;

DESCRIPTION OF THE EMBODIMENTS

Modes for carrying out the technique of the present disclosure are described below using the drawings.

Embodiment 1

In the present embodiment, an image forming apparatus having a storing unit (storage) as a memory in which to store print data (image data) is described. For example, in response to a user instructing the image forming apparatus to store print data via a printer driver in a terminal, image data generated from the print data is stored in the storing unit of the image forming apparatus. The image data thus stored can not only be used for printing as is, but also be subjected to various kinds of processing such as preview display using a preview function in the image forming apparatus.

Also, in a case where the image forming apparatus performs color-to-monochrome conversion, text or a graphic in a page that forms print data may be color-converted so as to improve discriminability, and a picture such as a photograph may be color-converted so as to maintain gradation. In a case of performing two divided color conversions, it is conceivable to execute color conversion on an object having an attribute such as text or a graphic before storing in order to increase the image processing speed. However, in this case, a picture object in the stored data has not been color-converted. Then, in a case where the stored image data is transmitted or displayed as a preview based on the image data, a user who sees the image may be given a feeling of strangeness.

Thus, in the present embodiment, a method for performing control to prohibit preview display and the like in a case where image data is stored after image processing is performed on only part of the image.

[Configuration of the Image Processing System]

Figure 1:
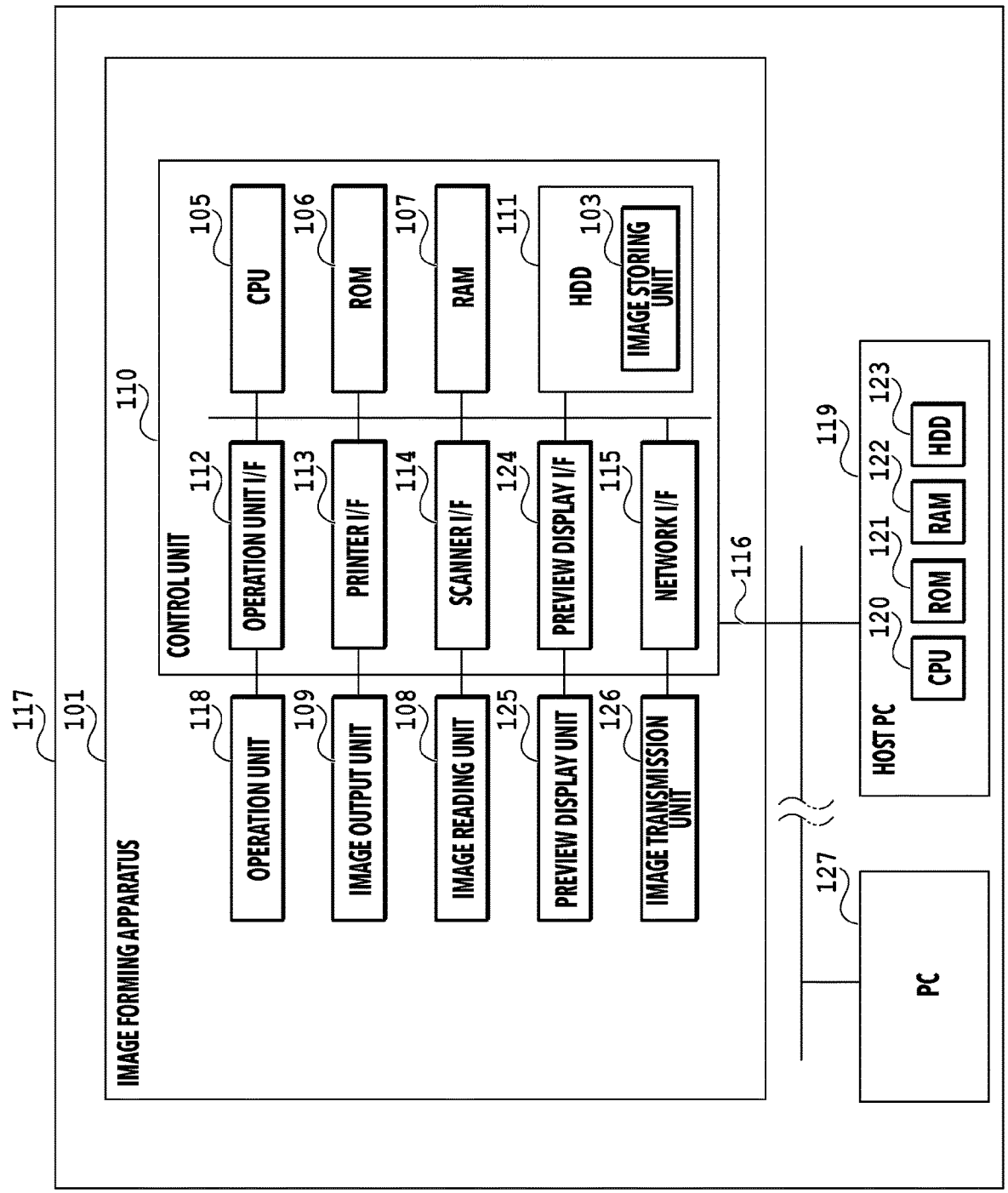
FIG. 1 is a block diagram showing the configuration of an image processing system.

FIG. 1 is a diagram showing an example configuration of an image processing system 117 according to the present embodiment. The image processing system 117 has an image forming apparatus 101 and a host PC 119. Also, the image processing system 117 is coupled to an external PC 127 including a cloud or a server that performs image processing.

The image forming apparatus 101 of the present embodiment is a multi-function peripheral (MFP) integrally including a plurality of functions which are not only a function as an image processing apparatus but also, for example, a scanning function and a printer function. The image forming apparatus 101 has a control unit 110, an operation unit 118, an image output unit 109, an image reading unit 108, a preview display unit 125, and an image transmission unit 126.

The control unit 110 performs overall control of the image forming apparatus 101. The control unit 110 has a CPU 105, a ROM 106, a RAM 107, an HDD 111, an operation unit I/F 112, a printer I/F 113, a scanner I/F 114, a network I/F 115, and a preview display I/F 124.

The CPU 105 controls the operation of the image forming apparatus 101 by loading a program stored in the ROM 106 into the RAM 107 and executing the program. The RAM 107 is a temporary memory and can temporarily store therein image data, programs, and the like. The ROM 106 has stored therein, e.g., parameters for controlling the image forming apparatus 101, an application, a program, and an OS for implementing the control according to the present embodiment.

The HDD 111 stores therein image data scanned and obtained by the image reading unit 108. Also, the HDD 111 has an image storing unit 103 to save (store), e.g., a print image in print data. Although described as being inside the HDD 111 in the present embodiment, the image storing unit 103 may be provided in a different storage unit such as the ROM 106.

An image stored in the image storing unit 103 in the HDD 111 can be displayed as a preview on the preview display unit 125 via the preview display I/F 124. Also, a stored image can be transmitted from the image transmission unit 126 to the host PC 119 or the like through a LAN 116 via the network I/F 115.

The control unit 110 controls the operation unit 118 via the operation unit I/F 112. The operation unit 118 is, for example, a touch panel. Similarly, the control unit 110 controls the image output unit 109 via the printer I/F 113. The image output unit 109 is, for example, a printer. Also, the control unit 110 controls the image reading unit 108 via the scanner I/F 114. The image reading unit 108 is, for example, a scanner.

The control unit 110 controls the image transmission unit 126 via the network I/F 115. The control unit 110 receives an image or the like from the host PC 119 and transmits an image or the like to the host PC 119 through the LAN 116.

By loading a program stored in the ROM 106 into the RAM 107 and executing the program, the CPU 105 implements the scanning function of the image reading unit 108 reading an original and the printer function of outputting an image to, e.g., a recording medium such as a sheet via the image output unit 109.

Meanwhile, the host PC 119 is an information processing apparatus and has a CPU 120, a ROM 121, a RAM 122, and an HDD 123. The CPU 120 controls the operation of the host PC 119 by loading a program stored in the ROM 121 into the RAM 122 and executing the program. The RAM 122 is a temporary memory and can store images, programs, and the like temporarily.

[Functional Configurations Related to Print Processing]

Figure 2:
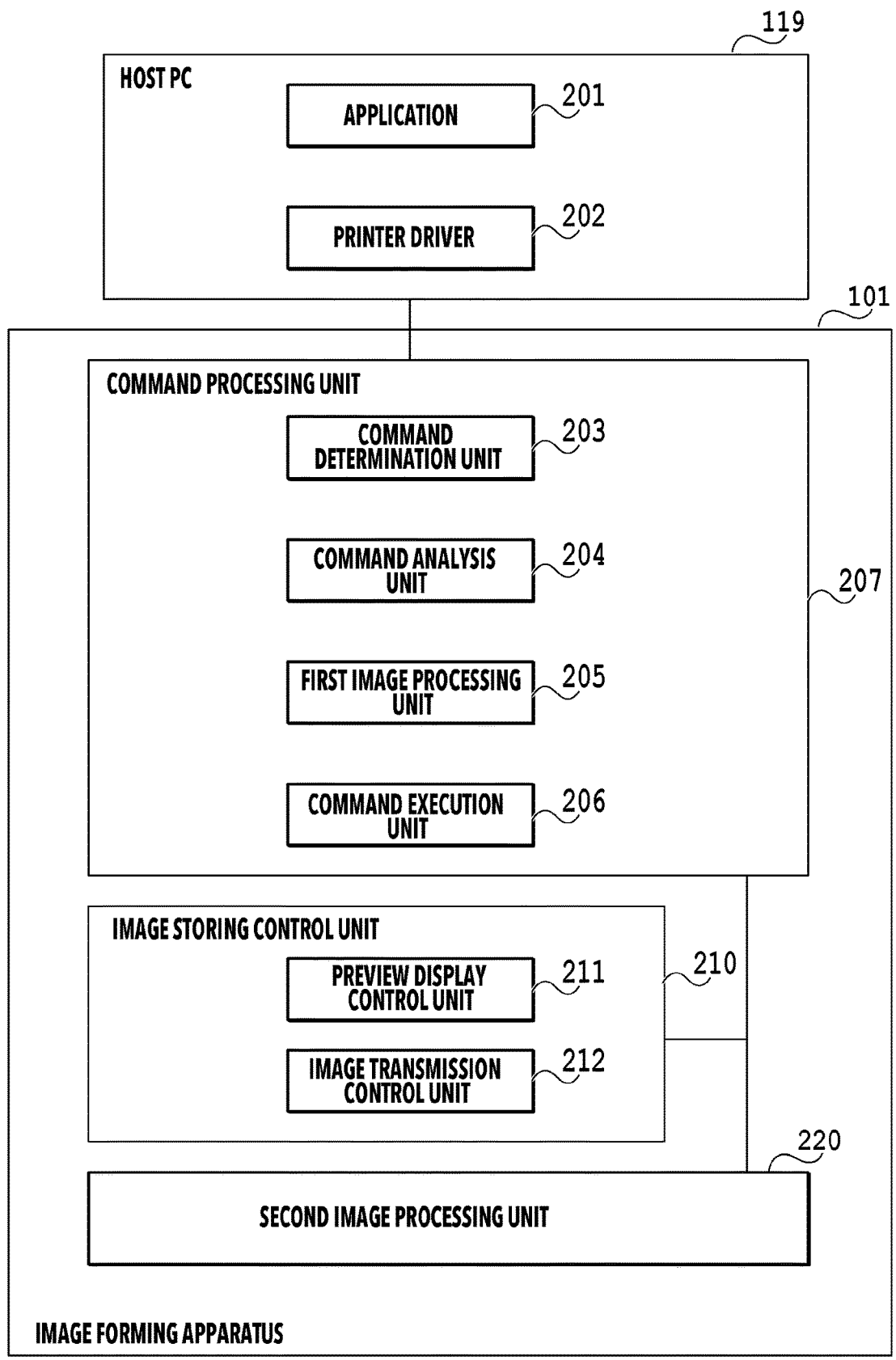
FIG. 2 is a block diagram showing the functional configurations of apparatuses in relation to printing processing.

FIG. 2 is a diagram illustrating the functional configurations of the image forming apparatus 101 and the host PC 119 related to print processing by the image processing system 117.

The host PC 119 has an application 201 and a printer driver 202. The application 201 and the printer driver 202 are installed in the ROM 121 of the host PC 119, and the CPU 105 controls them by loading a program stored in the ROM 121 into the RAM 122 and executing the program.

The application 201 is an application used to generate electronic data such as a document or a presentation.

The printer driver 202 is a driver for transmitting print data based on a document, a presentation, or the like to the image forming apparatus 101 to have an image printed by the image forming apparatus 101 based on the print data.

Figure 3:
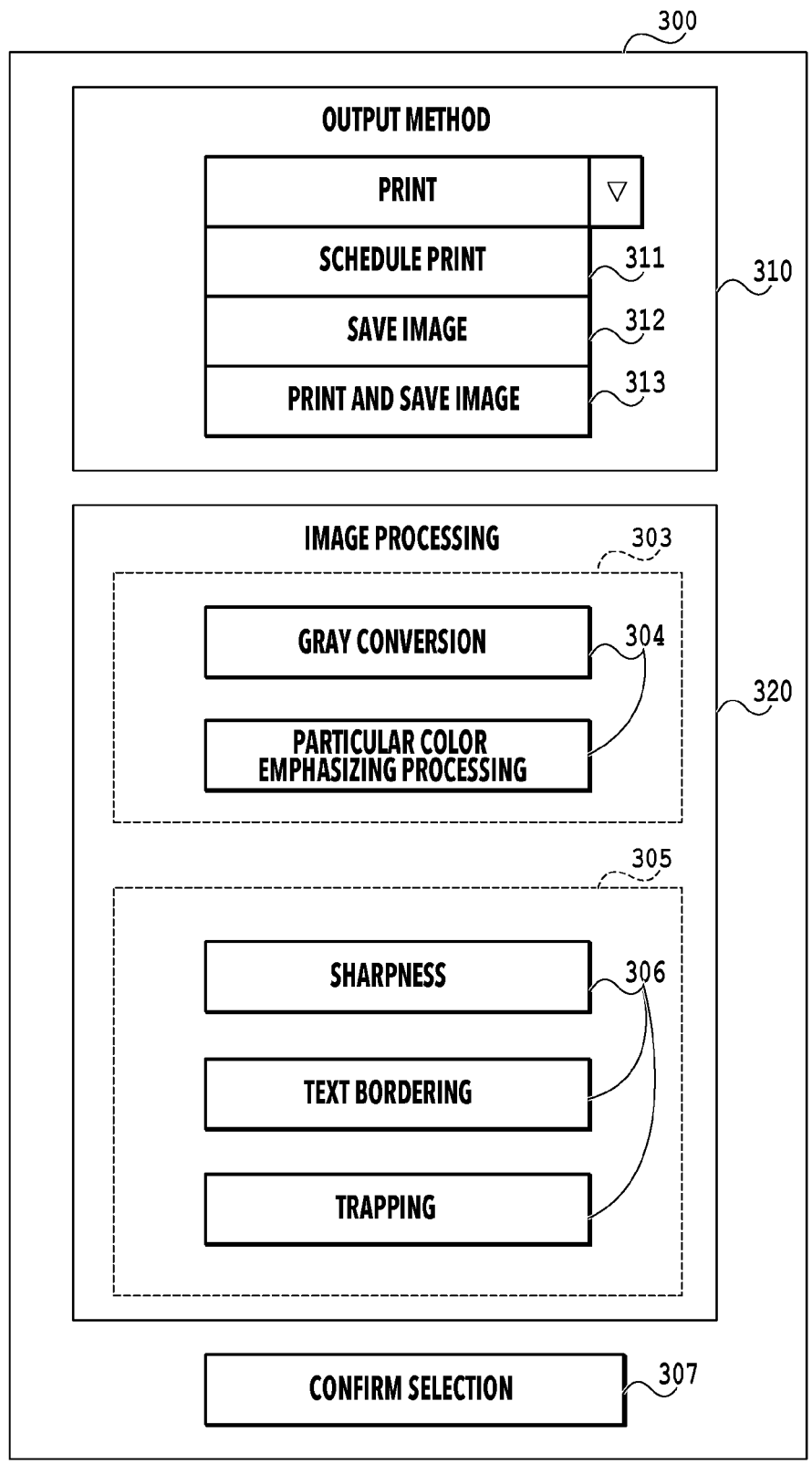
FIG. 3 is a diagram showing an example UI screen of a printer driver.

FIG. 3 is a diagram showing a UI screen 300 displayed by the printer driver 202 on a display unit (not shown) of the host PC 119. A user can instruct image processing with respect to print data via the UI screen 300.

A region 310 on the UI screen 300 is a region including options 311 to 313 of a print data output method to be executed by the image forming apparatus 101. By selecting any of the output methods included in the region 310, a user can instruct the image forming apparatus 101 to perform print processing on the print data and/or save (store) the print data in the image storing unit 103.

A region 320 on the UI screen 300 is a region including selection buttons 304, 306 for user selectable image processing. Once a user instructs image processing by selecting any of the selection buttons 304, 306 in the region 320, the image processing selected is executed on the print data. A region 303 is a region including image processing performed in two stages by a first image processing unit 205 to be described later and by a second image processing unit 220 to be described later.

Particular color emphasizing processing is processing of drawing a particular object in color and other objects in monochrome. In other words, processing is performed to convert color values of objects other than a particular object into gray values.

Print data transmitted from the host PC 119 via the printer driver 202 is received by the image forming apparatus 101. The image forming apparatus 101 converts the print data transmitted from the host PC 119 into raster image data. In a case where a user instructs save, the raster image data is stored in the image storing unit 103.

Next, the image-processing-related functional configuration of the image forming apparatus 101 is described. The image forming apparatus 101 has a command processing unit 207, an image storing control unit 210, and a second image processing unit 220. The command processing unit 207 has a command determination unit 203, a command analysis unit 204, a first image processing unit 205, and a command execution unit 206.

The command determination unit 203 determines the type of print description language (PDL) obtained by the control unit 110 of the image forming apparatus 101. PDL types include PostScript (PS), Printer Command Language (PCL), and the like.

The command analysis unit 204 executes extraction and analysis of the commands of the PDL type identified by the command determination unit 203.

As image processing according to the results of the analysis by the command analysis unit 204, the first image processing unit 205 performs color conversion processing on an object of a predetermined attribute, processing of adjusting the thickness of, e.g., a line or an object, and the like.

For example, in a case of converting a color page into a monochrome page, the first image processing unit 205 converts color information in color to color information in gray to improve discriminability with respect to a non-image attribute (such as a graphic or text) included in drawing commands for the print data. Note that the image processing executed by the first image processing unit 205 is also called first image processing. Specifically, color-to-gray conversion performed on a graphic or text to improve discriminability may be called first image processing.

The command execution unit 206 generates raster image data by executing processing by a raster image processor (RIP) (rasterization) to perform drawing based on the result of the analysis by the command analysis unit 204 and a result of the processing by the first image processing unit 205. Also, the command execution unit 206 generates attribute information describing information on the attributes of objects.

Next, processing performed by the image storing control unit 210 is described. The image storing control unit 210 stores raster image data and attribute information generated by the command execution unit 206 in the image storing unit 103 inside the HDD 111. The image storing control unit 210 also performs output control for outputting print data from the image storing unit 103 to the preview display unit 125 or the image transmission unit 126.

A preview display control unit 211 in the image storing control unit 210 performs processing for displaying a preview by outputting stored print data (raster image data) to the preview display unit 125. An image transmission control unit 212 in the image storing control unit 210 performs processing for outputting the stored print data (raster image data) to the image transmission unit 126 and transmitting the print data (raster image data) to an external apparatus.

The second image processing unit 220 performs various kinds of image processing using raster image data and attribute information generated by the command execution unit 206 or raster image data and attribute information stored in the image storing unit 103. For example, the second image processing unit 220 performs color conversion from the RGB color space to the CMYK color space, edge enhancement, sharpness processing such as smoothing, or the like. Further, the second image processing unit 220 performs gamma processing using a one-dimensional lookup table (LUT) according to the characteristics of a printer or dithering processing on a gamma processed image.

In converting a color page to a monochrome page, the second image processing unit 220 performs color conversion on an object having an attribute (picture) other than the attributes not subjected to color conversion by the first image processing unit 205. The image processing executed by the second image processing unit 220 is also called second image processing.

The CPU 105 implements the functions of the command processing unit, the image storing control unit 210, and the second image processing unit 220 of the image forming apparatus 101 shown in FIG. 2 by loading program code stored in the ROM 106 into the RAM 107 and executing the program code. Also, some or all of the functions of the units in FIG. 2 may be implemented by hardware such as an application-specific integrated circuit (ASIC) or an electric circuit. For example, at least the second image processing unit 220 may be implemented by an ASIC.

[Drawing Commands]

Figure 4A:
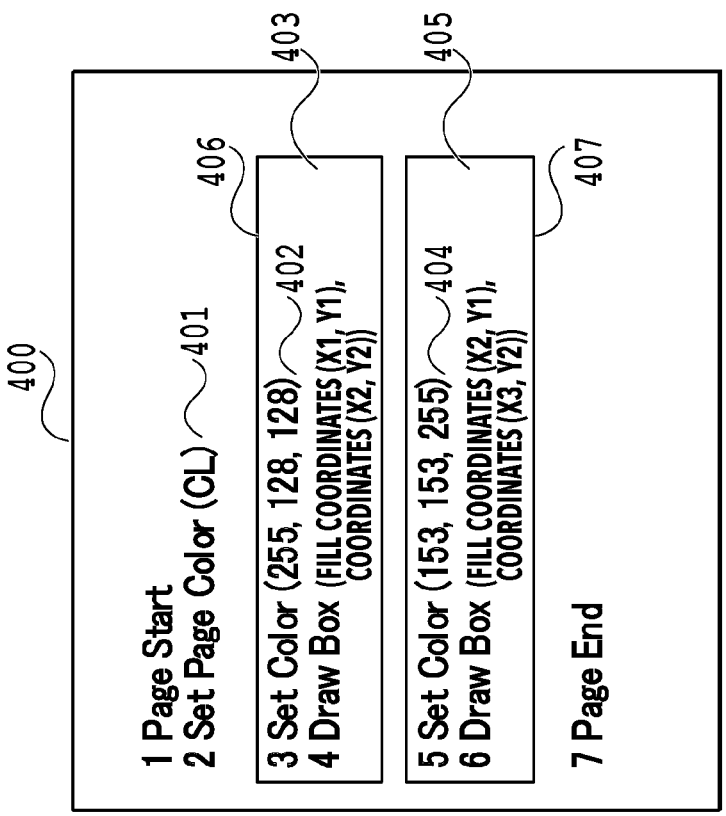
FIG. 4A is a diagram showing an example of drawing commands.
Figure 4B:
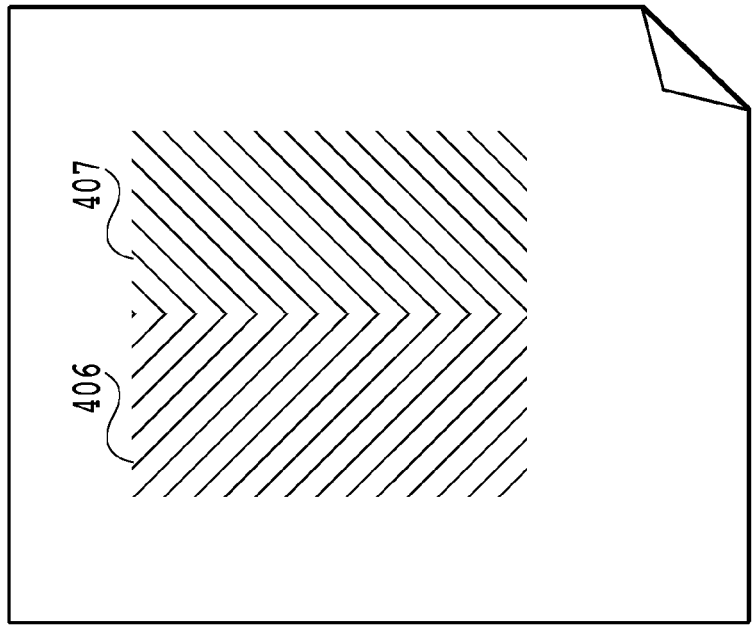
FIG. 4B is a diagram showing an example of an image drawn based on the drawing commands.

FIGS. 4A and 4B are diagrams showing drawing commands included in print data and an image on one page drawn based on the drawing commands. FIG. 4A is a diagram showing drawing commands included in print data obtained by the image forming apparatus 101, and FIG. 4B is a diagram showing an example of a result of drawing a page based on the drawing commands. Commands included in print data include drawing commands and control commands.

Control commands (not shown) include a command for specifying the output sheet size such as A4 and A3, a command for specifying N-in-1, N being the pages to be included in one output sheet, and a command for specifying finishing information such as specifying double-sided printing. Control commands also include a command for specifying conversion from a color image to a monochrome image, a command for specifying whether to store print data in the image storing unit 103, and the like.

As shown in FIG. 4A, drawing commands 400 include a color mode setting command 401 indicating the color mode of the job, color setting commands 402, 404 specifying a color in the RGB color space, and object drawing commands 403, 405 for drawing objects. Other commands include a text size setting command for setting a text size, a font setting command for setting a text font, and a text drawing command for drawing text. These commands have the same configuration as the color setting commands 402, 404 and the object drawing commands 403, 405. A command for setting coordinates and line thickness, a command for drawing a picture such as a photograph, and the like are also included, although not shown in FIG. 4A.

Next, a brief description is given of the contents of the drawing commands 400 depicted in FIG. 4A. Note that the color values included in the drawing commands 400 below are under the assumption of an 8-bit image. "Set Page Color (CL)" in the color mode setting command 401, which is the second one of the drawing commands 400, indicates that the subsequent command is in color.

The color setting command 402 "Set Color (255, 128, 128)", which is the third command, indicates that the value of RGB (RGB value) is red of R=255, G=128, and B=128. The object drawing command 403 "Draw Box (fill coordinates (X1, Y1) to coordinates (X2, Y2)," which is the fourth command, is a command indicating to draw a rectangular object from the coordinates (X1, Y1) to the coordinates (X2, Y2). As a result, as shown in FIG. 4B, an object 406 is drawn in a page in red of R=255, G=128, B=128. The region inside a rectangle denoted by reference numeral "406" in FIG. 4A indicates a region for drawing the object 406 in FIG. 4B.

The color setting command 404 "Set Color (153, 153, 255)," which is the fifth command, indicates that the RGB value is blue of R=153, G=153, and B=255. The object drawing command 405 "Draw Box (fill coordinates (X2, Y1) to coordinates (X3, Y2)," which is the sixth command, indicates to draw a rectangular object from the coordinates (X2, Y1) to the coordinates (X3, Y2). As a result, as shown in FIG. 4B, an object 407 is drawn in blue of R=153, G=153, B=255. The region denoted by reference numeral "407" in FIG. 4A indicates a region for drawing the object 407 in the page. By the drawing commands in the region 407, a blue object 407 can be drawn next to the object 406.

According to the analysis of the drawing commands 400 by the command analysis unit 204, the command execution unit 206 performs drawing and rasterization, thereby generating raster image data on one page including the objects 406, 407.

[Color-to-Monochrome Conversion for Discriminability Improvement (First Image Processing)]

Color conversion processing which is color to monochrome conversion is described here as an example of image processing performed in two stages: image processing on an object having a certain attribute in an image on one page and then image processing on an object having the rest of the attributes.

Hue and colorfulness information is lost by conversion from color values in color to color values in monochrome gray. Thus, seeing objects which are in different colors and converted to gray values, a user may be unable to tell (discriminate) that the objects are in different colors. Thus, in color-to-monochrome conversion used and described in the present embodiment, color conversion for improving discriminability is performed on an object having an attribute such as text or a graphic among objects to be drawn.

Figure 5:
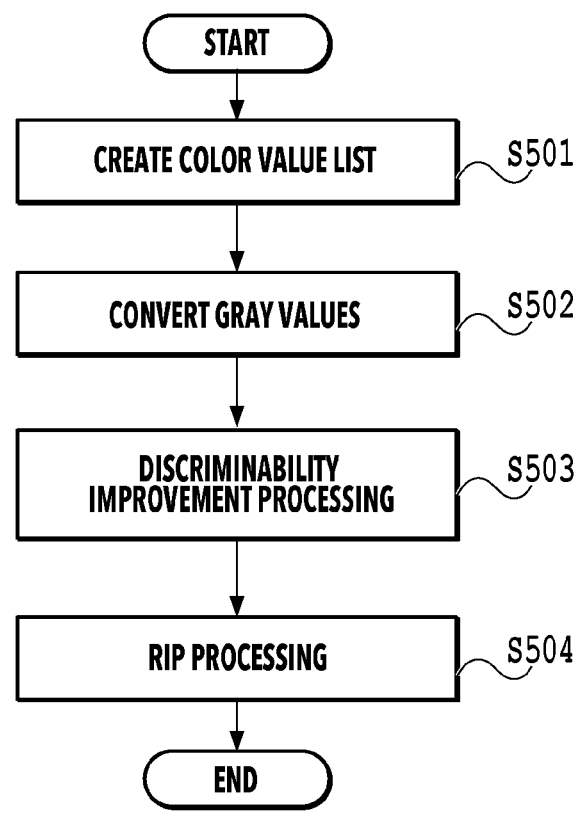
FIG. 5 is a flowchart showing how gray value conversion processing for discriminability improvement is performed.

FIG. 5 is a flowchart illustrating color-to-monochrome conversion processing performed using a color conversion method for improving discriminability. Using FIG. 5, a description is given of processing related to monochrome conversion for improving discriminability performed by the command analysis unit 204, the first image processing unit 205, and the command execution unit 206. The CPU 105 of the image forming apparatus 101 performs the series of processing shown in the flowchart in FIG. 5 by loading program code stored in the ROM 106 into the RAM 107 and executing the program code. Also, some or all of the functions in the steps in FIG. 5 may be implemented by hardware such as an ASIC or an electric circuit. Note that a letter "S" in the description of the processing means that it is a step in the flowchart, and this applies to the other flowcharts herein as well.

In S501, the command analysis unit 204 performs color value list creation processing. In the color value list creation processing, first, the command analysis unit 204 reads the inputted drawing commands 400 from the beginning to the end. Then, the command analysis unit 204 extracts all the color values (e.g., RGB values) specified by the color setting commands for objects having text and graphic attributes, which are attributes to be improved in discriminability. The command analysis unit 204 then adds the extracted color values to a color value list.

FIGS. 6A and 6B are diagrams illustrating the color value list generated in this step. A color value list 600 is a list for retaining RGB values extracted from the drawing commands 400.

A column 601 in the color value list 600 is a column for retaining a color value in the RGB color space as signal values of the respective color components. A column 602 is a column for retaining a grayscale value (a gray value) obtained as a result of color conversion of the corresponding color value in the column 601.

The drawing commands 400 have a command describing the two graphic objects 406, 407 having different color values. Thus, the color value list 600 has two rows corresponding to the objects 406, 407. In the color value list 600, each row corresponding to an object is denoted by the same reference numeral as the reference numeral of the object. For instance, in a row 406 of the color value list 600, a color value for the object 406 in FIG. 4B is specified, and arguments in "Set Color (255, 238, 128)" in the color setting command 402 in FIG. 4A are entered.

In S502, the first image processing unit 205 performs gray conversion on each RGB value entered in the column 601 of the color value list 600 based on a typical gray value conversion formula, and enters the result into the column 602 of the color value list 600. For example, like Formula (3) to be described later, a conversion formula for converting a color value into a gray value by multiplying the RGB signal values with different weights is used.

Gray conversion on the color value of the object 406, R=255, G=128, B=128, based on Formula (3) yields a gray value of 166. Similarly, the gray value of the object 407 is 165. The gray values are entered to the column 602 as shown in FIG. 6A.

Then, once the color value list 600 is completed after the color values of the target objects in the image of one page are entered, the color value list 600 is stored in the RAM 107.

In S503, the first image processing unit 205 corrects the gray values in the color value list 600 stored in the RAM 107 into discriminable gray values. For instance, in the color value list 600 shown in FIG. 6A, the gray value of the object 406 is 166, and the gray value of the object 407 is 165. Due to the small difference between the gray values of the two objects, it is determined that there is no discriminability.

In a case where it is determined that there is no discriminability, with respect to the gray values in the column 602 of the color value list 600, gray values are selected and allocated from a gray-value range from 0 to 255 to increase the gap between the gray values. A gray value is in a range from 0 (black) to 255 (white), and the gray values are allocated taking into consideration, for example, the difference between 255, which is a gray value of a paper white portion, and a gray value of the object and the difference between 0, which is a gray value of a solid black portion, and a gray value of the object. Then, concerning the gray value "255" of paper white, the gray value "166" of the object 406, the gray value "165" of the object 407, and the gray value "0" of the black portion, the gray values are allocated to increase the difference between 166 and 165. This processing can produce a difference in density between objects and can therefore improve the discriminability of the monochrome objects.

An example of a gray value calculation method for improving discriminability is described. For example, assume a case where there are only two objects, and the difference between the gray values of these two objects is to be increased to 70. In this case, processing is performed to increase the difference of the gray values while maintaining the ratio of a difference "89" between "255" which is a gray value of paper white and "166" which is a gray value of the object 406 to a difference "165" between "165" which is a gray value of the object 407 and "0" which is a gray value of a solid black portion.

Within a range of 256 possible values from "255" (white) to "0" (black), "70" is used here to increase the gap between the gray value of the object 406 and the gray value of the object 407. In this case, "185" which is a subtraction of "70" from "255" is a range for gray values, and a gray value X1 for the object 406 is found so as to correspond to the difference "89" between "255" (white) and "166" which is the gray value of the object 406. Specifically, the gray value X1 for the object 406 for improving discriminability is found using Formula (1).

$$(255-166)/255=(255-X1)/(255-70) \qquad \text{Formula (1)}$$

Similarly, in a case where "185" which is a subtraction of "70" from "255" is a range for gray values, a gray value X2 for the object 407 is found so as to correspond to the difference between "0" (black) and "165" which is the gray value of the object 407. Specifically, the gray value X2 for the object 407 for improving discriminability is found using Formula (2).

$$(165-0)/255=(X2-0)/(255-70) \qquad \text{Formula (2)}$$

Based on Formulae (1) and (2), $X1 \approx 190$ and $X2 \approx 120$ are found.

The color value list in FIG. 6B is a color value list 600 in which the gray values in the column 602 have been replaced with discriminability improving gray values obtained by the above method.

Gray values are expressed below as (a gray value of paper white, a gray value of the object 406, a gray value of the object 407, a gray value of a black portion). In the color value list 600 in FIG. 6A before discriminability improvement, the gray values are (255, 166, 165, 0), whereas in the color value list 600 in FIG. 6B, the gray values are changed to (255, 190, 120, 0). In the color value list 600 in FIG. 6B, the difference between the gray value of the object 406 and the gray value of the object 407 is 70, and because (255−166):(165−0)≈(255−190):(120−0), the ratio of the difference between the gray value of paper white and the gray value of the object 406 to the difference between the gray value of the object 407 and the gray value of a solid black portion is maintained.

The relation between a difference in gray value and discriminability can be said as follows: the larger the difference in gray value, the higher the discriminability. Also, a minimum necessary difference in gray value to give discrimination is a difference in gray value of 15 to 20, although it depends on the performance of the image forming apparatus 101.

In S504, the command execution unit 206 performs processing to convert image data (print data) from data expressed in PDL to raster image data. The command execution unit 206 reads the color value list 600 stored in the RAM 107. Then, in drawing an object having an attribute to be improved in discriminability, the command execution unit 206 generates raster image data by converting RGB values into gray values by reference to the color value list 600. Meanwhile, gray value conversion is not performed on an object having an attribute other than an attribute to be improved in discriminability (a picture). Thus, in the raster image data generated in this step, an object having an attribute to be improved in discriminability has been converted into a gray value, and an object having an attribute other than an attribute to be improved in discriminability is still expressed by RGB values.

As thus described, for an object with poor gray discriminability, color conversion processing for improving discriminability corrects a gray value in the color value list to improve its discriminability. The generation and correction of the color value list are performed before the rasterization processing in S504, and therefore discriminability can be improved by the gray value conversion by reference to the color value list during the rasterization processing.

[Color-to-Monochrome Conversion on a Picture (Second Image Processing]

Next, color-to-monochrome conversion on a picture such as a photograph is described. For pictures, gradation is often considered more important than discriminability. Thus, as an example of monochrome conversion on a picture, a method for calculating a gray value by performing weighting computation said to be close to brightness on the component values of a color RGB value is described. For example, a RGB value is converted to a gray value based on Formula (3).

Gray=0.299R+0.587G+0.114B    Formula (3)

In the present embodiment, the second image processing unit 220 calculates gray values for all pixels of a picture object in the raster image obtained by the rasterization processing by using the same arithmetic expression like Formula (3), thereby converting the RGB values.

The function of the second image processing unit 220 may be implemented by an ASIC. In a case of calculating gray values for all the pixels of a picture using the same arithmetic expression, high-speed processing can be achieved by using an ASIC to calculate a gray value on each pixel in the raster image.

Meanwhile, the function of the first image processing unit 205 may be implemented and configured by software by execution of a program by the CPU. Because the first image processing unit 205 performs color conversion on PDL data on an object-by-object basis, software implementation does not lower processing speed. Thus, low manufacturing cost and high image processing speed can be achieved by implementing the first image processing unit 205 with software and implementing the second image processing unit 220 with hardware such as an ASIC.

Comparative Example of Control Related to Storing Print Data

Figure 7:
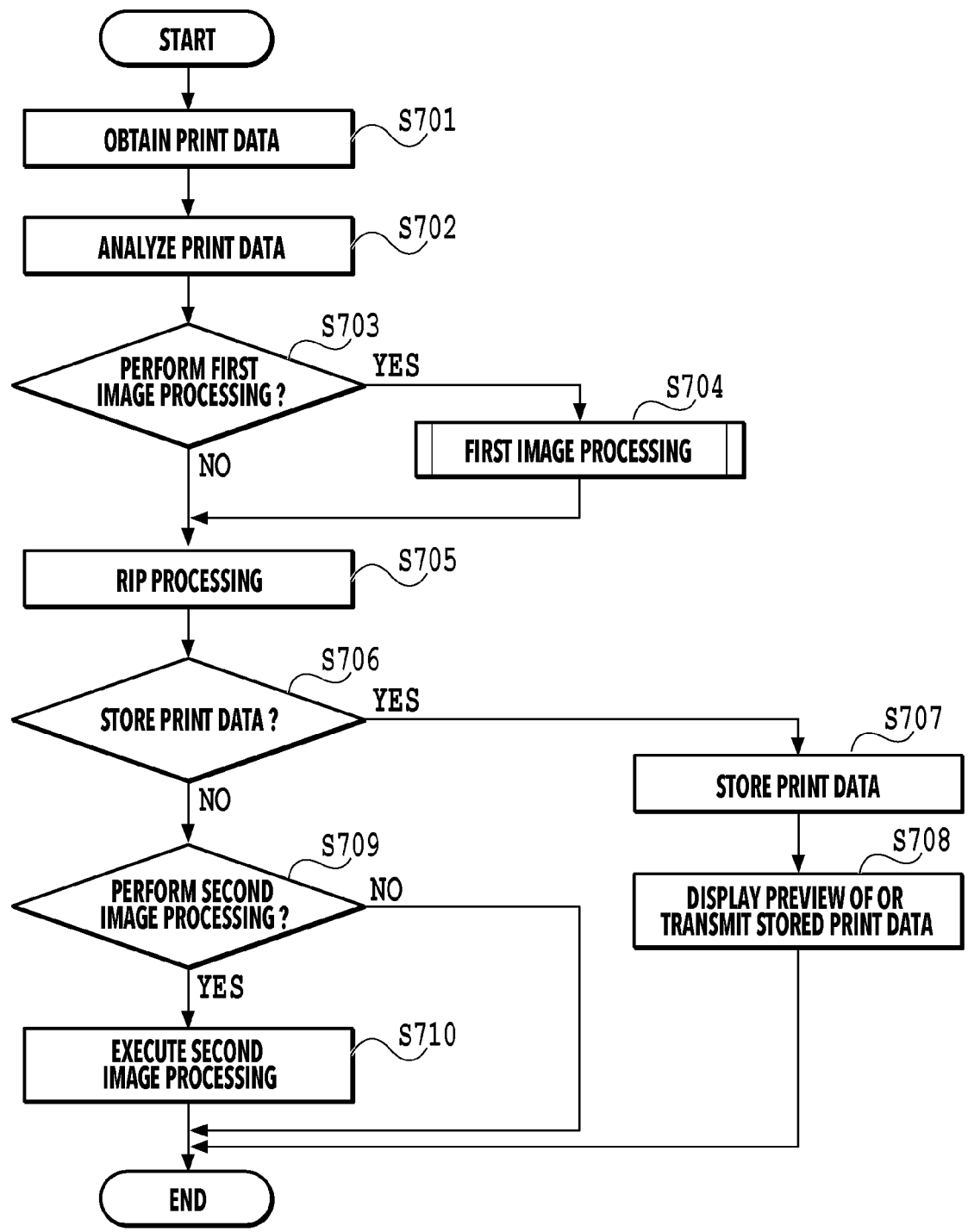
FIG. 7 is a flowchart showing a comparative example of storing control of print data.

FIG. 7 is a diagram illustrating a comparative example of control involving storing print data on a color page after performing image processing on the print data and, e.g., displaying a preview of the stored print data. A comparative example of control performed by the image forming apparatus upon a user instruction of storing is described using FIG. 7. Note that the flowchart in FIG. 7 is a flowchart for processing for one page.

The flowchart described below assumes that the first image processing is gray value conversion processing for improving discriminability and that the second image processing is gray value conversion processing for maintaining gradation.

In S701, the command determination unit 203 obtains print data from the host PC 119. Then, the command determination unit 203 determines the type of PDL.

In S702, the command analysis unit 204 analyzes the print data. Specifically, the command analysis unit 204 analyzes drawing commands and control commands included in the print data. For example, from the control commands, the command analysis unit 204 obtains specification to monochromatically convert an image in print data, information whether to store the print data, and the like. Also, from the drawing commands, the command analysis unit 204 obtains, e.g., RGB values of objects in the print data.

In S703, based on results of the command analysis in S702, the first image processing unit 205 determines whether the first image processing needs to be performed.

If the first image processing needs to be performed (YES in S703), processing proceeds to S704. In S704, the first image processing is performed. In a case where the first image processing is color conversion from color values to gray values, processing from S501 to S503 in the flowchart in FIG. 5 is performed in S704.

In the color conversion processing for improving discriminability, as described earlier, the first image processing unit 205 extracts color values of target objects from the entire page. To extract all the RGB values of a non-image object, i.e., a text or graphic object, it is more efficient to obtain an RGB value on an object-by-object basis from drawing commands written in PDL before the execution of RIP processing than to obtain an RGB value of each pixel of a raster image. Further, as to conversion of an RGB value into a corresponding gray value, it is more efficient to convert corresponding RGB values into a desired gray value in bulk on an object-by-object basis than to do the conversion pixel by pixel. Thus, if the determination result is YES in S703, the first image processing is executed in this step, which is before RIP processing is performed.

Meanwhile, if the first image processing does not need to be performed (NO in S703), processing skips S704 and proceeds to S705. In S705, the command execution unit 206 generates raster image data by rasterizing (performing RIP processing on) the print data. In a case where color conversion is performed in S704 as the first image processing, processing in S705 is the same as S504 in FIG. 5, and rasterization is performed while performing color conversion based on the color value list 600. Thus, in the generated raster image data, a picture has not been color-converted into gray values, while text or a graphic has been color-converted into a gray value. Image data (print data) in steps after S705 is raster image data, and this applies to the other flowcharts below as well.

In S706, the image storing control unit 210 determines whether to store (save) the rasterized print data (image data on a raster image) in the image storing unit 103. In this step, the determination is made based on the results of analysis by the command analysis unit 204 in S702. As described earlier, in a case where a user has selected "save" via the UI screen 300 of the printer driver 202, the image storing control unit 210 determines to store the print data in the image storing unit 103. Meanwhile, in a case where a user has selected "print" via the UI screen 300, the image storing control unit 210 determines not to store the print data in the image storing unit 103.

If it is determined not to store the print data (NO in S706), it means that an instruction to print and output the print data has been given. In this case, in S709, the CPU 105 determines whether the second image processing needs to be performed. In this step, in a case where, for example, it is determined based on the results of the command analysis in S702 that a picture is included, it is determined that the second image processing is necessary.

If it is determined that the second image processing needs to be performed (YES in S709), processing proceeds to S710, where the second image processing unit 220 performs the second image processing on a picture portion of the raster image. If it is determined that the second image processing does not need to be performed (NO in S709), S710 is skipped. After this flowchart ends, the print data is sent to the image output unit 109.

Meanwhile, if it is determined to store the print data (YES in S706), processing proceeds to S707. In S707, the image storing control unit 210 saves (stores) the rasterized print data (raster image data) in the image storing unit 103.

Next, in S708, in a case where a user has instructed to display a preview of the stored print data, the preview display control unit 211 displays a preview based on the stored print data. In a case where a user has instructed via the operation unit 118 to transmit the stored print data to a PC or the like, the image transmission control unit 212 transmits the stored print data via the image transmission unit 126.

There are cases where the drawing commands in the print data obtained in S701 earlier include a command for drawing a picture in addition to text or a graphic. In this case, in the raster image being the stored print data, the text or graphic has been converted into gray values and the picture has not been converted into gray values.

For this reason, with the method of the comparative example, an image displayed as a preview based on the stored print data has monochromatically-converted text or graphic and a color picture. Also, with the method of the comparative example, in a case of transmitting the stored print data, similarly, an image having monochromatically-converted text or graphic and a color picture is displayed on a display unit (not shown) of the host PC 119 which receives the print data from the image forming apparatus 101.

Thus, it is conceivable to store the print data (raster image data) after converting the picture into gray values. However, color conversion of a picture requires pixel-by-pixel computations, and therefore, in a case where, for example, most of an A4-size page is a picture, computations need to be performed for the pixels of 7016×4961 (600 dpi). For 1200 dpi, computations required quadruple. Thus, with a method of storing print data after color conversion of a picture, it takes time until the completion of storing.

[Control Related to Storing Print Data in the Present Embodiment]

Figure 8:
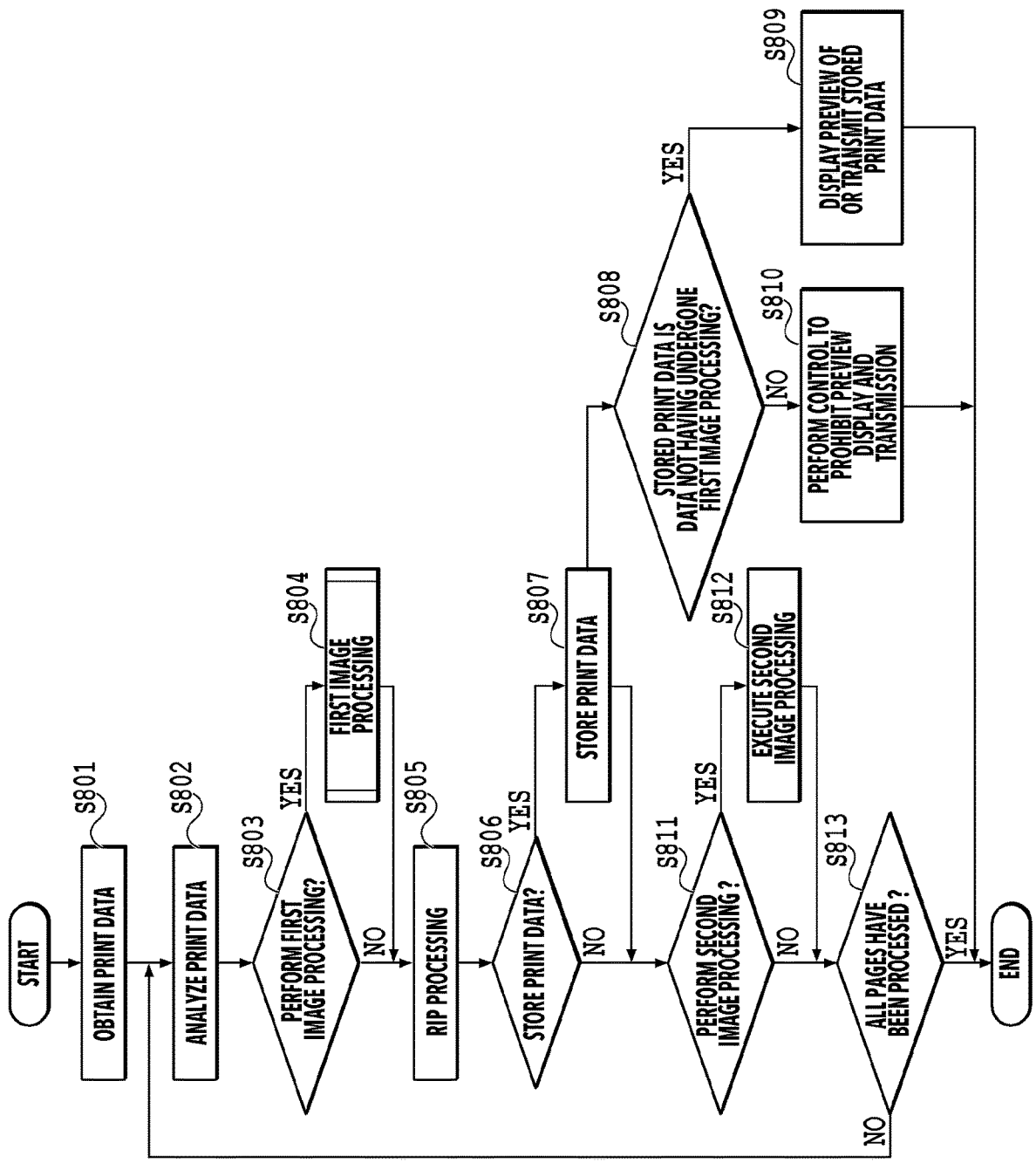
FIG. 8 is a flowchart illustrating storing control of print data.

FIG. 8 is a diagram illustrating control related to storing print data in the present embodiment. The CPU of the image forming apparatus 101 performs the series of processing shown in the flowchart in FIG. 8 by loading program code stored in the ROM into the RAM and executing the program code. Also, some or all of the functions in the steps in FIG. 8 may be implemented by hardware such as an ASIC or an electric circuit.

Note that the following flowchart is also described assuming that the first image processing is gray value conversion processing for improving discriminability and the second image processing is gray value conversion processing for maintaining gradation.

S801 to S805 are the same as S701 to S705 and are therefore not described here. As to how to determine whether to perform the first image processing in S803, it is determined not to perform the first image processing in a case where, for example, control commands in the print data have specification to perform color printing. Also, even in a case of monochrome printing, it is determined not to perform the first image processing in a case where drawing commands do not include a command for drawing text or a graphic. Also, in a case where monochrome printing is specified but there is no instruction to improve discriminability, it is determined not to perform the first image processing because the second image processing unit 220 will perform color conversion processing on the entire raster image.

S806 is the same processing as S706, and the image storing control unit 210 determines whether to save (store) the print data (raster image data) in the image storing unit 103. If it is determined to store the print data (YES in S806), processing proceeds to S807.

In S807, the image storing control unit 210 saves (stores) the print data in the image storing unit 103. If there is a next page, processing may proceed to S813 to repeat S802 to S806 until print data for all the pages are stored.

In S808, the image storing control unit 210 determines whether the print data (raster image) stored in S807 is data not having undergone the first image processing. In this step, for example, based on the results of the command analysis in S802, the image storing control unit 210 determines whether the first image processing has been performed on the print data. Alternatively, in S804, the first image processing unit 205 may issue an indication that the first image processing has been performed, and upon receipt of the information, the image storing control unit 210 may determine that the first image processing has been performed.

If the stored print data (raster image) is data not having undergone the first image processing (YES in S808), it means that the data is not such that only an object of a certain attribute has been color-converted. In other words, the stored raster image data (print data) is data on an image including only a picture. Thus, the image has all the objects in color and does not give a feeling of strangeness to a user in a case where, e.g., a preview is displayed based on the raster image (print data).

Alternatively, in S808, the image storing control unit 210 may determine whether the printed data (raster image data) stored in the image storing unit 103 is data that does not need the second image processing. If the second image processing is unnecessary (YES in S808), it means that the stored raster image data (print data) is data on an image including only an object of a non-image attribute (such as text or a graphic). Thus, the image has all the objects color-converted to gray values and therefore does not give a feeling of strangeness to a user in a case where, e.g., a preview is displayed based on the store raster image (print data). The determination may be performed like in S709, and for example, it is determined that the second image processing is unnecessary if no picture is included based on the results of the command analysis in S802.

Alternatively, in S808, it may be determined whether the stored print data (raster image) is either data not having undergone the first image processing or data that does not need the second image processing.

If the determination result in S808 is YES, processing proceeds to S809 which is the same as S708.

In S809, in a case where a user instructs to display a preview of the stored print data via the operation unit 118, the preview display control unit 211 outputs the stored raster image data (print data) to the preview display unit 125. Then, the preview display unit 125 displays a preview based on the raster image data. In a case where a user instructs to transmit the stored print data to a PC or the like via the operation unit 118, the image transmission control unit 212 outputs the stored print data to the image transmission unit 126. Then, the image transmission unit 126 transmits the print data (raster image data).

Meanwhile, if the first image processing has been performed or if the second image processing needs to be performed (NO in S808), processing proceeds to S810. In S810, the image storing control unit 210 performs control so that a preview will not be displayed based on the print data (raster image data) which is the target of the determination in S808. Alternatively, the image storing control unit 210 performs control to prohibit transmission of the stored print data (raster image data).

Specifically, in a case where a user instructs preview display or transmission via the operation unit 118, the image storing control unit 210 performs control not to accept the preview display or transmission instruction by displaying a UI screen prohibiting preview display and transmission on the touch panel as the operation unit 118. Alternatively, in a case where a user selects the stored print data via the operation unit 118, the image storing control unit 210 performs control not to accept an instruction for preview display or transmission by graying out buttons for instructing preview display and transmission on the touch panel as the operation unit 118. In this case, in a case where print data for all the pages are stored with even one of the pages having undergone the first image processing, control may be performed so that print data for all the pages are not previewed or transmitted. Alternatively, control may be performed so that only the page having undergone the first image processing is not previewed.

Meanwhile, if the image output unit 109 performs printing processing based on the print data (NO in S806), processing proceeds to S811. In S811, the CPU 105 determines whether to perform the second image processing. This step performs the same processing as S709, and for example, the determination may be made based on the results of the command analysis in S802 or may be made upon receipt of an indication that the first image processing has been performed, which may be issued in S804.

If it is determined that the second image processing needs to be performed (YES in S811), processing proceeds to S812, and the second image processing unit 220 performs the second image processing on the picture portion of the raster image and then transmits the image to the image output unit 109. If it is determined that the second image processing does not need to be performed (NO in S811), S812 is skipped, and the print data is sent to the image output unit 109.

As the options 313 on the UI screen 300 of the printer driver show, a user may select both "save" and "print" for the print data. In this case, processing related to storing in S807 to S810 and processing related to printing in S811 to S812 are performed in parallel. For example, the image data stored in S807 may be copied and passed to S811, or print data may be copied in S806, saved in S807, and also passed to S811. In a case where it is instructed to print the stored print data, processing proceeds from S807 to S811, and printing processing is performed based on the stored print data.

In S813, the CPU 105 checks whether all the pages have been processed, and if not all the pages have been processed, proceeds back to S802 to repeat the processing for the next page. Meanwhile, if all the pages have been processed, the flowchart ends.

As thus described, according to the present embodiment, it is determined whether a condition that only an object of a certain attribute has been color-converted is met, and processing is switched based on the result of the determination. Thus, a user does not see an image in which only some of the objects are image-processed, which can make it unlikely to give a user a feeling of strangeness.

Although color-to-monochrome conversion is described as image processing in the present embodiment, the present embodiment can be applied to a different type of image processing. Also, although the first image processing unit 205 and the second image processing unit 220 are both in the image forming apparatus 101 in the present embodiment described, the first image processing unit 205 may be implemented inside the PC 127, and the second image processing unit 220 may be implemented inside the image forming apparatus 101. In this case, after the first image processing unit in the PC 127 performs the first image processing, the image forming apparatus 101 prohibits preview display and transmission of the stored image. This mode can also offer advantageous effects similar to those offered by the method described above.

Embodiment 2

Embodiment 1 describes a method for making it unlikely to give a user a feeling of strangeness by prohibiting preview display or transmission of image data in which only some of the objects in the image are image-processed. The present embodiment describes a method for making it unlikely to give a user a feeling of strangeness by performing control so as not to store image data in which only some of the objects are image-processed. Differences from Embodiment 1 are mainly described in the present embodiment. Portions not specifically described here have the same configurations and processing as those in Embodiment 1.

Figure 9:
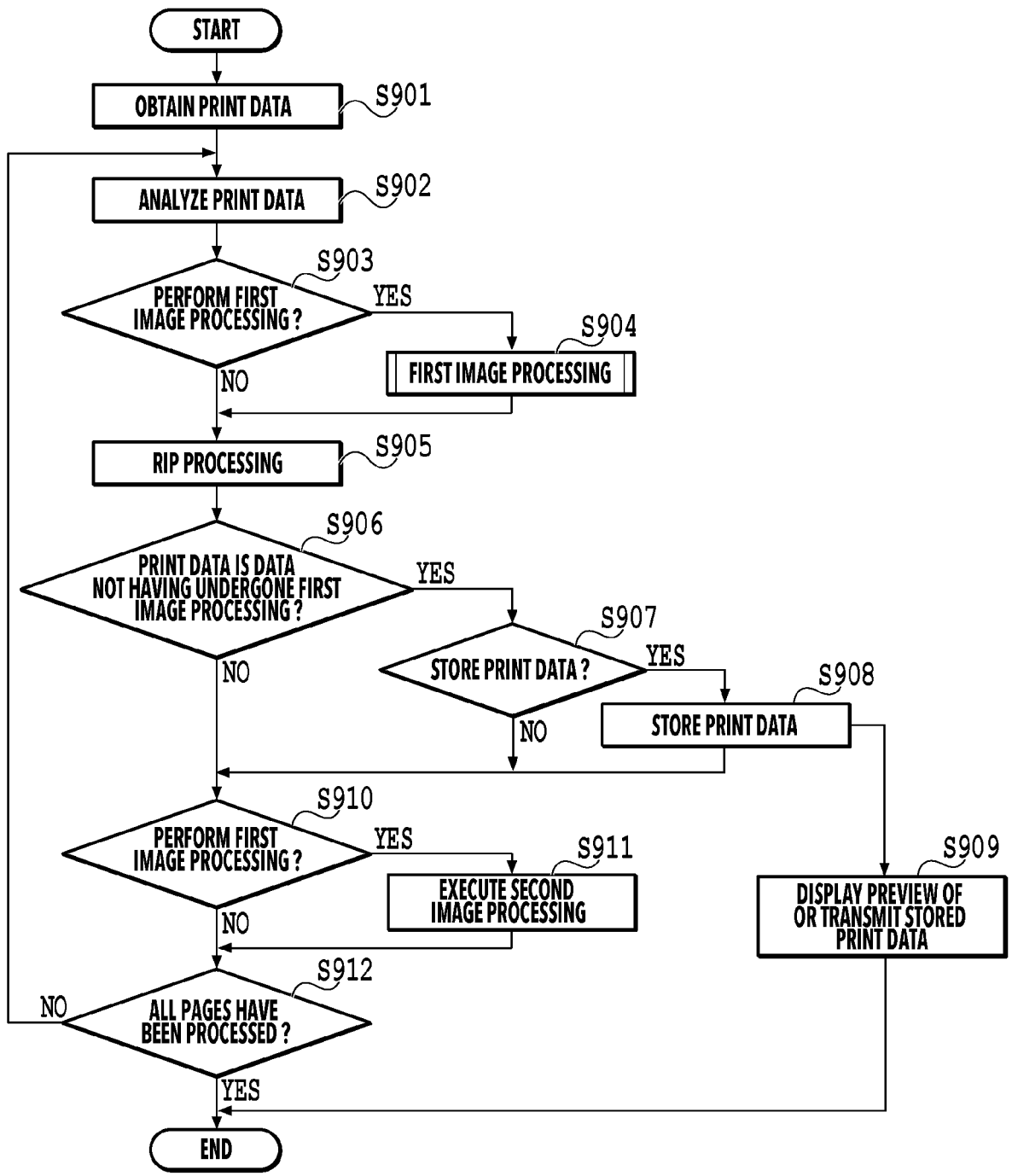
FIG. 9 is a flowchart illustrating storing control of print data.

FIG. 9 is a flowchart illustrating storing control of the present embodiment. The flowchart in FIG. 9 is also described assuming that the first image processing is gray value conversion processing for improving discriminability and that the second image processing is gray value conversion processing for maintaining gradation.

Processing from S901 to S905 is the same as that from S801 to S805 and is therefore not described.

In S906, the image storing control unit 210 determines whether the print data is data not having undergone the first image processing. Alternatively, the image storing control unit 210 may determine whether the print data is data that does not need the second image processing. The method for the determination of this step may be the same as that used in S808.

In the present embodiment, unlike Embodiment 1, the determination of whether the first image processing has been performed is performed in a step right after image data (print data) is converted into raster image data by RIP processing.

If it is determined that the print data has not undergone the first image processing or if it is determined that the second image processing is unnecessary (YES in S906), processing proceeds to S907. S907 is the same processing as S806, and the image storing control unit 210 determines whether to store the print data (raster image data). If it is determined to store the print data (YES in S907), processing proceeds to S908. S908 is the same processing as S807, and the image storing control unit 210 stores the print data in the image storing unit 103. Then, processing proceeds to S909. S909 is the same processing as S809, and the stored print data (raster image data) is either displayed as a preview or transmitted via the image transmission unit 126.

Meanwhile, if it is determined in S906 that the first image processing has been performed or if it is determined that the second image processing is necessary (NO in S906), processing proceeds not to S907, but to S910.

In S910, the CPU 105 determines whether to perform the second image processing. The determination in S910 may be performed using a method similar to that used in S811. Also, if it is determined in S906 that the second image processing is necessary (NO in S906), processing may skip S910 and proceed to S911.

In this way, in the present embodiment, if it is determined that the print data has undergone the first image processing, processing does not proceed to Step S908 of storing the print data. Thus, if the determination result of S906 is NO and an instruction to store the print data is given via the printer driver 202, a predetermined notification may be given to a user via the screen of the touch panel as the operation unit 118, indicating that storing has been canceled. Alternatively, after a selection confirmation button on the UI screen 300 is pressed on the display unit (not shown) of the host PC 119, a UI screen indicating that the instruction for save has been canceled may be displayed.

If it is necessary to perform the second image processing (YES in S910), processing proceeds to S911. If the second image processing is unnecessary (NO in S910), S911 is skipped, and the print data is sent to the image output unit 109. S911 to S912 are the same processing as S812 to S813 and are therefore not described here.

As thus described, in the present embodiment, control is performed not to store an image in which only some of the objects are image-processed. Thus, according to the present embodiment, an image in which only an object of a certain attribute has been color-converted is not used for a preview display or transmission. Thus, a user does not see an image in which only an object of a certain attribute is image-processed, and thus it is unlikely to give the user a feeling of strangeness.

Embodiment 3

In the methods according to the embodiments described above, the image forming apparatus 101 performs control so that an image that has undergone the first image processing will not be used for preview display or transmission. In a method of the present embodiment to be described, the printer driver 202 performs control so that an image that has undergone the first image processing will not be used for preview display or transmission. Differences from Embodiment 1 are mainly described in the present embodiment. Portions not specifically described here have the same configurations and processing as those in Embodiment 1.

Figure 10:
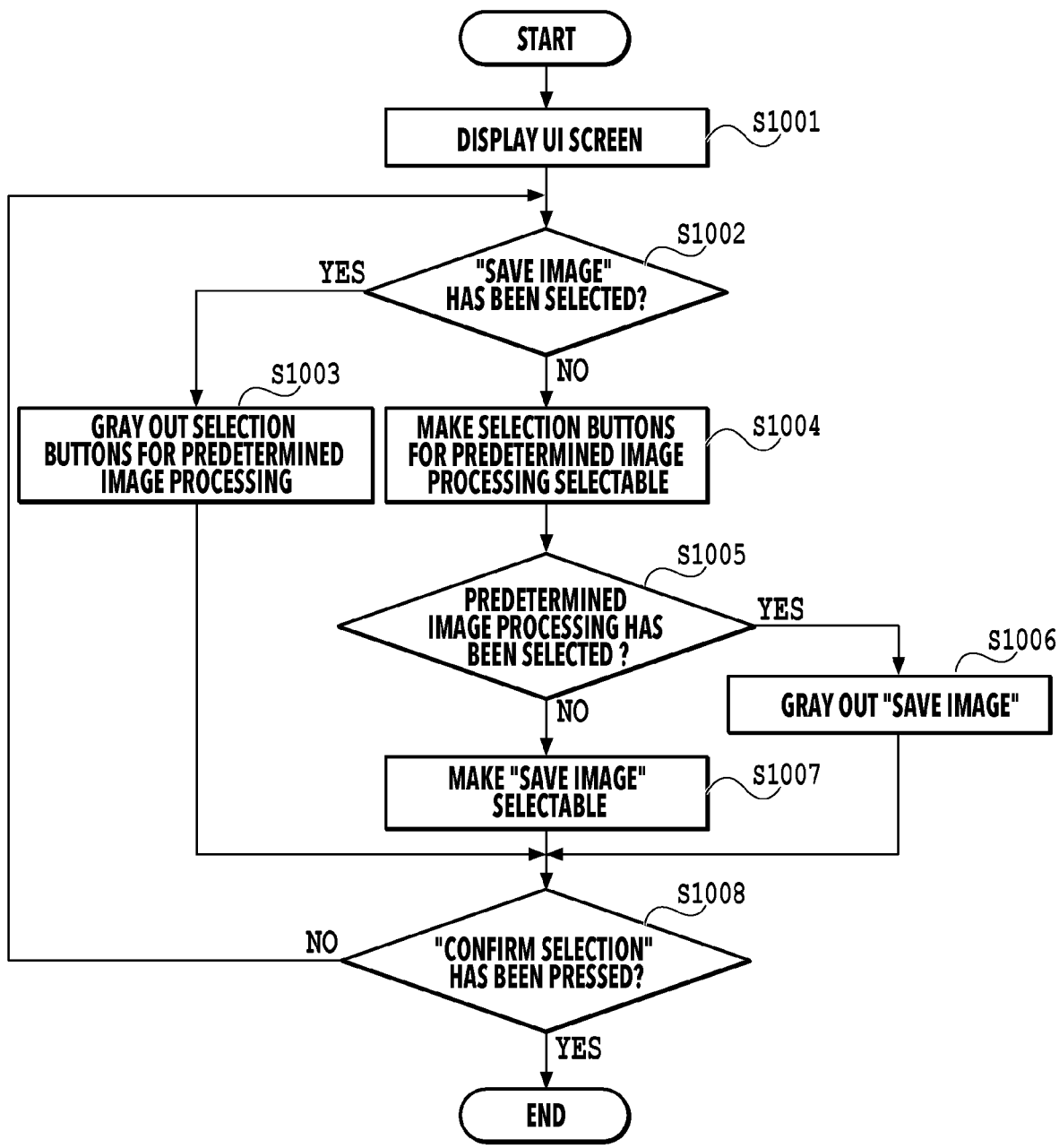
FIG. 10 is a flowchart of UI screen display control performed by a printer driver.

FIG. 10 is a flowchart illustrating UI screen display control performed by the printer driver 202. The CPU 120 of the host PC 119 performs the series of processing shown in the flowchart in FIG. 10 by loading program code stored in the ROM 121 into the RAM 122 and executing the program code. Also, some or all of the functions in the steps in FIG. 10 may be implemented by hardware such as an ASIC or an electric circuit.

The flowchart in FIG. 10 is started in response to the printer driver 202 being activated by a user operating the host PC 119. Note that the flowchart in FIG. 10 is a diagram for illustrating processing related to UI screen display control, which is part of processing performed by the printer driver 202. The printer driver 202 may perform other processing.

In S1001, the printer driver 202 displays the UI screen 300 shown in FIG. 3 on the display unit (not shown) of the host PC 119.

In S1002, the printer driver 202 determines whether, of the options 311 to 313 in the region 310 of the UI screen 300, "save image" as the option 312 or "save and print image" as the option 313 has been selected.

If "save image" or "save and print image" has been selected (YES in S1002), processing proceeds to S1003. In S1003, the printer driver 202 performs display control of the UI screen 300 so as not to allow a user to select selection buttons 304 in the region 303 of the UI screen 300. For example, the printer driver 202 performs control so as not to allow a user to select the selection buttons 304 by, e.g., graying out the selection buttons 304 or not displaying the selection buttons 304.

Image processing in the region 303 includes monochrome conversion (gray conversion) converting color information from color values to gray values described in Embodiments 1 and 2 and particular color emphasizing processing. In other words, the image processing in the region 303 is image processing performed on some objects before the print data is stored.

Meanwhile, selection buttons 306 in a region 305 for user selectable image processing are not grayed out. Image processing included in the region 305, such as text bordering processing, is processing performed on the entire page before the print data is stored or processing performed on the entire raster image indicated by the print data after the print data is stored.

If neither "save image" nor "save and print image" is selected (NO in S1002), processing proceeds to S1004. In S1004, if display control has been performed not to allow a user to select the selection buttons 304 in the region 303 of the UI screen 300, the printer driver 202 re-enables a user to select the selection buttons 304 in the region 303.

In S1005, the printer driver 202 determines whether, of the selection buttons for selecting image processing in the UI screen 300, any image processing button included in the region 303 has been selected. If an image processing button included in the region 303 is selected (YES in S1005), processing proceeds to S1006. In S1006, the printer driver 202 performs display control of the UI screen 300 so that a user cannot instruct storing the print data. For example, the printer driver 202 grays out the option 312 for "save image" and the option 313 for "save and print image."

If an image processing button included in the region 303 is not selected (NO in S1005), processing proceeds to S1007. In S1007, if display control has been performed not to allow the options 312, 313 in the region 310 of the UI screen 300 to be selected, the printer driver 202 re-enables a user to select the options 312, 313.

In 51008, the printer driver 202 determines whether a selection confirmation button 307 on the UI screen 300 has been pressed to confirm the selection made. If the selection confirmation button 307 has not been pressed, processing proceeds back to S1002 to repeat the processing. If the selection confirmation button 307 has been pressed, the processing of this flowchart ends.

As thus described, in the present embodiment, the UI screen 300 is controlled so that a user cannot instruct color conversion and storing an image in the image forming apparatus 101 at the same time. Thus, according to the present embodiment, an image in which only an object of a certain attribute has been image-processed is prevented from being stored. Thus, it is unlikely to give a feeling of strangeness to a user.

Although the UI screen displayed on the display unit of the host PC 119 is controlled in the method described above, display control can be performed for a UI screen displayed on the operation unit 118 of the image forming apparatus 101 using the flowchart in FIG. 10.

The technique of the present disclosure can help prevent a user from seeing an image in which only an object of a certain attribute has been color-converted.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-139996 filed Aug. 30, 2021, which is hereby incorporated by reference wherein in its entirety.

What is claimed is:

1. An image forming apparatus comprising:
   one or more memories; and
   one or more controllers including one or more processors and the one or more memories, the one or more controllers configured to:
      obtain print data including drawing commands;
      perform conversion of color information for drawing an object having a non-image attribute among objects to be drawn by the drawing commands;
      generate raster image data based on the drawing commands;
      store the generated raster image data in the one or more memories to perform predetermined output;
      perform conversion of color information on an object having a picture attribute in the generated raster image data; and
      perform the predetermined output in a case where a predetermined condition is met.

2. The image forming apparatus according to claim 1, wherein
   the case where the predetermined condition is met is a case where the first image processing unit has not performed conversion of color information on an object having a non-image attribute.

3. The image forming apparatus according to claim 1, wherein
   the case where the predetermined condition is met is a case where the second image processing unit does not need to perform conversion of color information.

4. The image forming apparatus according to claim 1, wherein
   the predetermined output is either output to a display unit configured to perform preview display or output to a transmission unit configured to perform transmission of the stored raster image data.

5. The image forming apparatus according to claim 4, wherein
   the image forming apparatus is configured to allow a user to instruct the preview display or the transmission of the stored raster image data, and
   in a case where the predetermined condition is not met, the one or more controllers are configured to perform control so as not to allow the user to instruct the preview display or the transmission.

6. The image forming apparatus according to claim 1, wherein
   in a case where the predetermined condition is not met, the one or more controllers are configured to perform control so as not to allow the generated raster image data to be stored in the storage.

7. The image forming apparatus according to claim 6, wherein
   in a case where the control so as not to allow the generated raster image data to be stored in the storage is performed, a predetermined notification is given to a user.

8. The image forming apparatus according to claim 1, wherein the one or more controllers are further configured to analyze commands included in the print data.

9. The image forming apparatus according to claim 8, wherein
based on results of the analysis, the one or more controllers are configured to determine whether the first image processing unit has performed conversion of color information on an object having a non-image attribute.

10. The image forming apparatus according to claim 8, wherein
based on results of the analysis, the one or more controllers are configured to determine whether the second image processing unit needs to perform conversion of color information.

11. The image forming apparatus according to claim 1, wherein
the one or more controllers do not perform conversion of color information in a case where attributes of the objects to be drawn by the drawing commands do not include a non-image attribute.

12. The image forming apparatus according to claim 1, wherein
processing of the conversion of color information for drawing the object is processing of converting color information from color values to gray values for improving discriminability, and
processing of the conversion of color information on the object having the picture attribute is processing of converting color values to gray values using a single conversion formula.

13. The image forming apparatus according to claim 1, wherein
the the one or more controllers are configured by software.

14. The image forming apparatus according to claim 1, wherein
the the one or more controllers are configured by an ASIC.

15. A method for controlling an image forming apparatus, the method comprising:
obtaining print data including drawing commands;
performing conversion of color information for drawing an object having a non-image attribute among objects to be drawn by the drawing commands;
generating raster image data based on the drawing commands;
storing the generated raster image data to perform predetermined output;
performing conversion of color information on an object having a picture attribute in the generated raster image data; and
performing the predetermined output in a case where a predetermined condition is met.

16. A non-transitory computer readable storage medium storing a program which causes a computer to perform a method for controlling an image forming apparatus, the method comprising:
obtaining print data including drawing commands;
performing conversion of color information for drawing an object having a non-image attribute among objects to be drawn by the drawing commands;
generating raster image data based on the drawing commands;
storing the generated raster image data to perform predetermined output;
performing conversion of color information on an object having a picture attribute in the generated raster image data; and
performing the predetermined output in a case where a predetermined condition is met.

17. An information processing method for transmitting print data including drawing commands to an image forming apparatus,
the image forming apparatus comprising:
one or more memories; and
one or more controllers including one or more processors and the one or more memories, the one or more controllers configured to:
obtain the print data;
perform conversion of color information for drawing an object having a non-image attribute among objects to be drawn by the drawing commands;
generate raster image data based on the drawing commands;
store the generated raster image data in the one or more memories to perform predetermined output;
perform conversion of color information on an object having a picture attribute in the generated raster image data; and
perform the predetermined output,
the method comprising:
displaying a UI screen on a display unit to have a user instruct image processing to be performed on the print data,
wherein, in a case where the user instructs the conversion of color information, the method includes displaying the UI screen to disable the user from instructing to store the generated raster image data, and in a case where the user instructs to store the generated raster image data, the method includes displaying the UI screen to disable the user from instructing the conversion of color information.

18. A non-transitory computer readable storage medium storing a program which causes a computer to perform an information processing method for transmitting print data including drawing commands to an image forming apparatus,
the image forming apparatus comprising:
one or more memories; and
one or more controllers including one or more processors and the one or more memories, the one or more controllers configured to:
obtain the print data;
perform conversion of color information for drawing an object having a non-image attribute among objects to be drawn by the drawing commands;
generate raster image data based on the drawing commands;
store the generated raster image data in the one or more memories to perform predetermined output;
perform conversion of color information on an object having a picture attribute in the generated raster image data; and
perform the predetermined output,
the method comprising:
displaying a UI screen on a display unit to have a user instruct image processing to be performed on the print data,
wherein, in a case where the user instructs the conversion of color information, the method includes displaying the UI screen to disable the user from instructing to store the generated raster image data, and in a case where the user instructs to store the generated raster image data, the method includes displaying the UI screen to disable the user from instructing the conversion of color information.

* * * * *